United States Patent [19]

Takamori et al.

[11] 3,932,556

[45] Jan. 13, 1976

[54] THERMOSETTING RESIN COMPOSITION

[75] Inventors: Shigeru Takamori, Osaka; Eizi Morimoto; Kahei Sakaguchi, both of Wakayama, all of Japan

[73] Assignee: Kao Soap Co., Ltd., Tokyo, Japan

[22] Filed: Nov. 22, 1974

[21] Appl. No.: 526,109

[30] Foreign Application Priority Data

Nov. 27, 1973 Japan............................ 48-133214

[52] U.S. Cl....... 260/836; 260/78.4 EP; 260/78.5 R; 260/837 R
[51] Int. Cl.².......................................... C08L 63/00
[58] Field of Search........................... 260/836, 837

[56] References Cited
UNITED STATES PATENTS

| | | | |
|---|---|---|---|
| 3,066,112 | 11/1962 | Bowen | 260/837 R |
| 3,150,118 | 9/1964 | Clemens | 260/78.5 R |
| 3,179,623 | 4/1965 | Bowen | 260/837 R |
| 3,367,992 | 2/1968 | Bearden | 260/837 R |
| 3,632,861 | 1/1972 | Hargis | 260/837 R |
| 3,670,047 | 6/1972 | Broecker | 260/837 R |
| 3,810,826 | 5/1974 | Mani | 260/837 R |

*Primary Examiner*—Paul Lieberman
*Attorney, Agent, or Firm*—Woodhams, Blanchard and Flynn

[57] ABSTRACT

A thermosetting resin composition consisting essentially of (1) a prepolymer having a thermal vinyl group, prepared by reacting (a) a polyepoxide compound with at least one equivalent, per epoxy group of said polyepoxide compound, of (b) a dicarboxylic acid half ester having the formula:

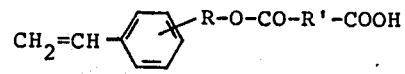

wherein R is

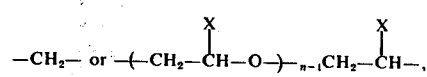

in which $n$ is an integer of 1 to 4 and X is H or $CH_3$, and R' is a divalent aliphatic group having 2 to 6 carbon atoms or a divalent aromatic radical having 6 or 7 carbon atoms; and (2) a vinyl monomer copolymerizable therewith.

4 Claims, No Drawings

THERMOSETTING RESIN COMPOSITION

BACKGROUND OF THE INVENTION

1. Field of the Invention

This invention relates to a thermosetting resin composition consisting essentially of a prepolymer having more than one double bond of the styrene type at the terminals of the molecule and a vinyl monomer.

An object of this invention is to provide a thermosetting resin composition which can form a cured material possessing improved mechanical properties, such as impact resistance, resistance to chemicals, air-setting properties and so on.

2. Description of the Prior Art

Thermosetting resins that undergo a curing reaction due to the copolymerization of (1) a prepolymer having a double bond capable of radical polymerization with (2) a vinyl monomer, are known, and reference can be made to unsaturated polyesters as typical. However, these have disadvantages in that they shrink greatly during curing and the cured products are poor in impact resistance. With respect to a thermosetting resin improved in, especially, its impact resistance, for example, Japanese Patent Publication Nos. 15988/1970 and 25178/1970 disclose a resin with a terminal diacryl group in the molecule. Although such a resin has favorable properties, it has an insufficient air-setting property. The resin becomes sticky because of the insufficient setting of the surface when in contact with air.

SUMMARY OF THE INVENTION

This invention relates to a thermosetting resin composition consisting essentially of (1) a prepolymer having a double bond of the styrene type at the ends of the molecule, and (2) a vinyl monomer copolymerizable with (1). The composition of this invention possesses excellent air-setting properties, and this composition possesses not only a thermosetting property but also it can be cured at room temperature in a very short time. In addition, when using a vinyl monomer, such as styrene, for example, the composition of this invention can provide a uniformly set resin with excellent mechanical properties, and impact resistance, because the prepolymer is advantageously copolymerizable with said monomer.

According to the present invention, there is provided a thermosetting resin composition consisting essentially of (1) a prepolymer having a terminal vinyl group, prepared by reacting (a) a polyepoxide compound with at least one equivalent, per epoxy group of said polyepoxide compound, of (b) a dicarboxylic acid half ester having the formula:

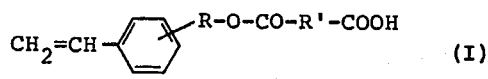

(I)

wherein R is

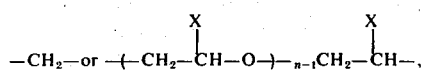

in which $n$ is an integer of 1 to 4 and X is H or $CH_3$, and R' is a divalent aliphatic group having 2 to 6 carbon atoms or a divalent aromatic radical having 6 or 7 carbon atoms; and (2) a vinyl monomer copolymerizable therewith.

The polyepoxide is an organic epoxy compound having more than one epoxy group in the molecule, and examples that can be used in the present invention, include a glycidyl polyether obtainable from a polyhydric alcohol and a polyhydric phenol, a glycidyl polyester of a polyhydric aliphatic acid, an epoxidized aliphatic acid or an epoxidized drying oil acid, an epoxidized polyolefin, and an ester of an epoxidized diunsaturated acid.

As examples of the polyepoxide compound, there can be enumerated a diglycidyl ether of polyethylene glycol, a diglycidyl ether of polypropylene glycol, a triglycidyl ether of glycerin, a diglycidyl ether of 2,2-bis(4-hydroxyphenyl)-propane, a diglycidyl ether of tetrabromobisphenol A, a tetraglycidyl ether of tetraphenyleneethane, a polyglycidyl ether obtained by the reaction of epichlorohydrin or methyl epichlorohydrin with a novolak resin which is obtained by the reaction between phenol and formaldehyde (the so-called "epoxidized novolak resin"), a diglycidyl ester obtained by reacting phthalic acid with epichlorohydrin or methyl epichlorohydrin, epoxidized soybean oil, 3,4-epoxy-6-methyl-cyclohexyl methyl-3,4-epoxy-6-methyl-cyclohexane carboxylate, epoxidized polybutadiene, 3,4-epoxy-cyclohexyl methyl-3,4-epoxycyclohexane carboxylate, and 1-epoxyethyl-3,4-epoxycyclohexane. Also, polyepoxides derivable from nitrogen-containing compounds can be used, for example, the diepoxide obtained by the reaction of aniline with epichlorohydrin or methyl epichlorohydrin, the triepoxide obtained by the reaction of aminophenol with epichlorohydrin or methyl epichlorohydrin or the like.

The dicarboxylic acid half ester of Formula I used in this invention, can be synthesized from a compound having the formula:

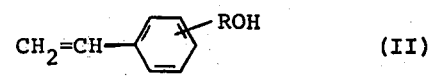

(II)

wherein R is

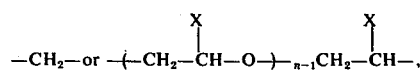

in which $n$ is an integer from 1 to 4 and X is H or $CH_3$, and a dicarboxylic acid, or anhydride thereof, having the formulae:

(III)

or

(IV)

wherein R' is a saturated or olefinically unsaturated divalent aliphatic hydrocarbon group having 2 to 6 carbon atoms, or a divalent unsaturated cyclic group having 6 or 7 carbon atoms in total, having a 6 carbon unsaturated ring from two different carbon atoms of which a hydrogen atom has been removed to provide the valence bonds, having up to one carbon atom in a substituent group or in a bridging group between two carbon atoms, having up to 6 halo atoms as substituents and the balance being carbon and hydrogen atoms.

The compound of Formula II can be, for example, p-vinylbenzyl alcohol, o-vinylbenzyl alcohol, p-(2-hydroxypropyl)-styrene, p-hydroxyethylstyrene, o-hydroxyethylstyrene, ethylene glycol-mono[β-(p-vinylphenyl)ethyl]ether, triethylene glycol-mono[β-(p-vinylphenyl)ethyl]ether or the like.

The compound of Formula I can be obtained by the reaction of about equimolar amounts of the compound of Formula II with the dicarboxylic acid or dicarboxylic anhydride (Formula III or IV).

The dicarboxylic acid (III) or dicarboxylic acid anhydride (IV) used for the production of the half ester can be, for example, fumaric acid, maleic acid, maleic anhydride, succinic acid, succinic anhydride, adipic acid, phthalic anhydride, isophthalic acid, tetrahydrophthalic anhydride, tetrabromophthalic anhydride, tetrachlorophthalic anhydride, chlorendic acid, terephthalic acid, methyl phthalic acid, methyl isophthalic acid, methyl terephthalic acid and the like.

The reaction of the organic epoxy compound having more than one epoxy group in the molecule with the compound of Formula I involves the use of at least one equivalent amount of the compound of Formula I per epoxy group of the epoxide compound, and the reaction is carried out in the presence or absence of catalysts such as tertiary amines, phenols, and addition products of tertiary amines and inorganic or organic acids. In the reaction, a minor amount of, for example, hydroquinone, tertiary butyl catechol, benzoquinone, etc. can be used as a polymerization inhibitor if necessary or desired. The prepolymer having a terminal vinyl group (1) is produced in this way.

As the vinyl monomer copolymerizable with the prepolymer in the present invention, there can be used the members of the general class of polymerizable vinyl monomers, examples of which are styrene, p-chlorostyrene, tertiary butylstyrene, methylmethacrylate, acrylonitrile, vinylpyrrolidone, acrylic acid, ethyl acrylate, vinyl acetate, isoprene and the like.

The weight ratio of (1) the prepolymer : (2) the vinyl monomer, can be in the range of 30–99.5:70–0.5, preferably from 40:60 to 75:25.

The curing of the resin composition in accordance with the present invention generally involves conventional free radical-initiated polymerization. The addition of catalytic amounts, e.g. from 0.1 to 5.0 percent by weight of peroxides or azobis-base radical polymerization initiators is satisfactory, and it also occurs at room temperature by using redox system initiators or by the addition of catalytic amounts of dimethylaniline, cobalt naphthenate etc. It is also possible to cause the curing polymerization by means of ultraviolet rays or electron beams.

The composition of the present invention can be used in a wide variety of technological fields, such as, for example, casting articles, molding articles such as fiber-reinforced plastics, coatings and adhesives.

The invention is further described by reference to the following illustrative examples.

EXAMPLE 1

162 Grams (one mol) of p-(2-hydroxypropyl)styrene and 100 g (one mol) of succinic anhydride were charged into a four-necked flask and heated at 80°C. for 5 hours to produce a compound of the formula

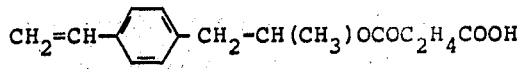

Upon confirmation of the completion of the monoesterification, there was added 180 g of epoxy-novolac (Trade name "Dow Epoxy Novolac DEN–438", made by Dow Chemical Co., Ltd., epoxy equivalent : 180) that contained adducted epichlorohydrin to the phenolic hydroxyl group of the novolac, together with 0.2 g of hydroquinone, used as the polymerization inhibitor, and 1 g of dimethylamine hydrochloride, used as the catalyst, and the reaction mixture was maintained at 120°C. for 2.5 hours. The prepolymer thus obtained by this reaction had an acid value of 7.2. This prepolymer was cooled to 80°C., and then to it was added 362 g of tertiary butylstyrene to form a tertiary butylstyrene solution of the prepolymer, i.e., a resin composition of this invention.

To this vinyl monomer solution of the prepolymer were added 0.5 weight % of cobalt naphthenate and 1.3 weight % of methyl ethyl ketone peroxide and the resulting solution of this invention was then cured at room temperature (the pot-life was 40 min.). The product, post-cured at 100°C. for 2 hours, exhibited a tensile strength of 11.5 kg/cm², an elongation of 0.5 % and a Charpy impact strength (notch) of 6.2 kg.cm/cm². Its heat distortion temperature was 141°C. and its air-drying property was also very good.

A fiber glass reinforced plastic sheet of 3 mm thickness was manufactured by a conventional method, using as the substrate three chopped strand glass mats (Trade Name "CM455FA", made by Asahi Fiber Glass Co., Ltd.) impregnated with the above novel resin composition as the binder resin and using the above curing and post-curing agents and conditions. The physical properties of the reinforced plastic sheet were tested. The bending strength of the thus-obtained sheet was 14.6 kg/cm² and its Barcol hardness was 40. The sheet was subjected to a heat resistance test in an oven at 190°C. for 500 hours, and no cracks were formed. The sheet after the heat resistance test exhibited a bending strength of 13.5 kg/mm². Thus there occurred only a small decrease in its bending strength as a consequence of the heat resistance test.

EXAMPLE 2

148 Grams (one mol) of o-hydroxyethylstyrene and 148 g (one mol) of phthalic anhydride were charged into a four-necked flask and heated at 80°C. for 5 hours to produce a compound of the formula

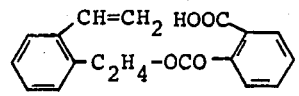

Upon confimation of the completion of the monoesterification, 558 g of the diglycidyl ether of polypropylene glycol (epoxy equivalent : 558), together with 4.3 g of triethylenediamine used as the catalyst, was added thereto followed by carrying out the reaction at 120°C. for 2.5 hours. The thus-obtained prepolymer was cooled to 80°C., and to it was added 285 g of methylmethacrylate to form a methylmethacrylate solution of the prepolymer.

Cobalt naphthenate and methyl ethyl ketone peroxide were added to this vinyl monomer solution of the prepolymer in an amount as in Example 1 and the resulting composition was cured at room temperature. The product was then postcured at 100°C. for one hour and it exhibited a tensile strength of 5.2 kg/cm², an elongation of 9.2 % and a Charpy impact strength (notch) of 11.3 kg/cm². Its heat distortion temperature was 60°C.

This resin composition exhibited a good adhesion to iron or wood when applied thereto and then given the above curing and postcuring treatments.

EXAMPLE 3

192 Grams (one mol) of ethylene glycol-mono[β-(p-vinylphenyl)ethyl]ether, 584 g (four mols) of adipic acid, 3.9 g of p-toluenesulphonic acid, 156 g of benzene and 0.3 g of hydroquinone were placed in a four-necked flask, and dehydrated and condensed at 120°C. for 4 hours under refluxing benzene. Benzene and the excess (about three nols) adipic acid were then removed at a temperature below 60°C. by reduced pressure distillation. Thereafter, p-toluenesulfonic acid was washed off with water. The product, sufficiently dried, had an acid value of 184. To the product thus monoesterified was added 138 g of 3,4-epoxy-cyclohexyl-methyl-3,4-epoxycyclohexanecarboxylate (Trade Name "Chisonox CX-221" made by Chisso Co., Ltd. epoxy equivalent : 138) and the mixture was subjected to reaction at 120°C. for two hours in the presence of 2.3 g of triethylenediamine. The prepolymer obtained in this reaction has an acid value of 7.2 This prepolymer was then cooled to 80°C. and 98 g of styrene and 98 g of methylmethacrylate were added thereto to form a vinyl monomer solution of the prepolymer.

As in Example 1, cobalt naphthenate and methyl ethyl ketone peroxide were added to the vinyl monomer solution of the prepolymer to effect curing thereof at room temperature. The product postcured at 100°C. for two hours showed a tensile strength of 7.6 kg/cm², an elongation of 6.5 % and a Charpy impact strength (notch) of 9.9 kg/cm², and its heat distortion temperature was 82°C.

This resin composition exhibited very excellent adhesion to iron and wood when used as described in the foregoing example.

EXAMPLE 4

268 Grams (two moles) of p-vinylbenzyl alcohol and 196 g (two mols) of maleic anhydride were charged in a four-necked flask and heated at 80°C. for 5 hours. Upon confirmation of the completion of the monoesterification, 484 g (one mol) of Epicoat 834, made by Shell Chemical Co., Ltd., (a diglycidyl ether of bisphenol A), 0.5 g of hydroquinone, used as the polymerization inhibitor, and 4 g of tri(dimethylaminomethyl)-phenol, were further added and the reaction was carried out at 120°C. for 2.5 hours. The obtained product was then cooled to 80°C., and 776 g of styrene was added thereto to prepare a styrene solution of the prepolymer.

0.5 Weight % of cobalt naphthenate 1.3 weight % methyl ethyl ketone peroxide were then added to this styrene solution of the prepolymer and cured at room temperature (it exhibited a pot life of 40 min.). The product postcured at 100°C. for 2 hours exhibited a tensile strength of 10.1 kg/cm², an elongation of 4.1 %, and a Charpy impact strength of 7.1 kg.cm/cm². Its heat distortion temperature was 108°C. and its air-drying property was also excellent.

Then, a fiber glass reinforced plastic sheet (FRP) of 3 mm thickness was prepared according to a conventional method, using as the substrate three chopped strand glass mats (Trade Name "CM 455 FA" made by Asahi Fiber Glass Co., Ltd.) under the above-mentioned curing conditions as described in Example 1.

The anticorrosion test on FRP test pieces of the above was carried out for 3 and 6 months by dipping them in the following liquids listed in the table below. The results are tabulated in the table.

| Liquid | Anticorrosion Test Condition | |
|---|---|---|
| | Concentration | Test Condition |
| Sulfuric acid | 75% Sulfuric Acid | Room temp. |
| Hydrochloric acid | 37% Hydrochloric acid | Room temp. |
| Caustic soda | 50% Caustic soda | Room temp. |

| | Anticorrosion Test Results | | | | | |
|---|---|---|---|---|---|---|
| | Bending strength (Kg/mm²) | | | Barcol Hardness | | |
| | Before dipping | After dipping | | Before dipping | After dipping | |
| Liquid | | 3 months | 6 months | | 3 months | 6 months |
| Sulfuric acid | 13.3 | 12.5 | 13.0 | 38 | 39 | 38 |
| Hydrochloric acid | 13.3 | 11.1 | 10.8 | 38 | 39 | 37 |
| Caustic soda | 13.3 | 12.0 | 12.3 | 38 | 37 | 37 |

The embodiments of the invention in which an exclusive property or privilege is claimed are defined as follows:

1. A thermosetting resin composition consisting essentially of (1) a prepolymer having a terminal vinyl group, produced by reacting a polyepoxide compound with at least one equivalent, per epoxy group of said polyepoxide compound, of a dicarboxylic acid half ester having the formula

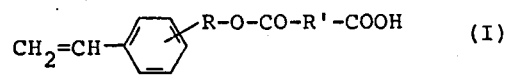

$$CH_2=CH-\phenyl-R-O-CO-R'-COOH \qquad (I)$$

where R is a member of the group consisting of $-CH_2-$ and $-(CH_2-CHX-O)_{n-1}-CH_2-CHX-$, in which $n$ is 1 to 4 and X is a member of the group consisting of H and $CH_3$, and R' is a member of the group consisting of divalent aliphatic radical of 2 to 6 carbon atoms and a divalent aromatic radical of 6 to 7 carbon atoms, and (2) a vinyl monomer copolymerizable therewith or a mixture of said vinyl monomers.

2. A thermosetting resin composition according to claim 1 wherein the vinyl monomer is a member of the group consisting of styrene, p-chlorostyrene, t-butylstyrene, methylmethacrylate, acrylonitrile, vinylpyrrolidone, acrylic acid, ethyl acrylate, vinyl acetate and isoprene.

3. A thermosetting resin composition according to claim 2 comprising a solution of (1) dissolved in (2).

4. The method of producing a cured resin article comprising forming a shaped article from a thermosetting resin composition comprising (1) a prepolymer having a terminal vinyl group, produced by reacting a polyepoxide compound with at least one equivalent, per epoxy group of said polyepoxide compound, of a dicarboxylic acid half ester having the formula

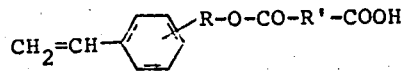  (I)

where R is a member of the group consisting of —$CH_2$— and —$(CH_2—CHX—O)_{n-1}—CH_2—CHX—$, in which $n$ is 1 to 4 and X is a member of the group consisting of H and $CH_3$, and R' is a member of the group consisting of divalent aliphatic radical of 2 to 6 carbon atoms and a divalent aromatic radical of 6 to 7 carbon atoms and (2) a vinyl monomer copolymerizable therewith or a mixture of said vinyl monomers, and about 0.1 to 5.0 percent by weight of a polymerization initiator, thus to form a solution of (1) in (2), forming said solution into said shaped article and curing said shaped article by causing polymerization thereof.

* * * * *